United States Patent
Kikuchi et al.

(10) Patent No.: US 7,053,328 B2
(45) Date of Patent: May 30, 2006

(54) METHOD FOR CONNECTING FILM-COATED WIRE TO SUBJECT MEMBER

(75) Inventors: Atsuo Kikuchi, Toyota (JP); Mamoru Urushizaki, Chiryu (JP); Hiroyasu Kanamori, Nagoya (JP)

(73) Assignee: DENSO Corporation, Kariya (JP)

( * ) Notice: Subject to any disclaimer, the term of this patent is extended or adjusted under 35 U.S.C. 154(b) by 189 days.

(21) Appl. No.: 10/438,520

(22) Filed: May 15, 2003

(65) Prior Publication Data
US 2003/0213775 A1 Nov. 20, 2003

(30) Foreign Application Priority Data
May 16, 2002 (JP) .............................. 2002-141062

(51) Int. Cl.
*B23K 11/16* (2006.01)
(52) U.S. Cl. .................................. 219/56.22; 219/91.21
(58) Field of Classification Search ............... 219/56.1, 219/56.21, 56.22, 91.21, 91.22
See application file for complete search history.

(56) References Cited

U.S. PATENT DOCUMENTS

| | | | |
|---|---|---|---|
| 4,687,898 A | | 8/1987 | Riordan et al. .......... 219/56.22 |
| 5,153,404 A | * | 10/1992 | Riordan et al. .......... 219/56.22 |
| 5,272,306 A | | 12/1993 | Hirane ..................... 219/110 |
| 5,660,742 A | | 8/1997 | Warner et al. ........... 219/85.16 |
| 6,265,664 B1 | * | 7/2001 | Sakaguchi et al. ............ 174/78 |
| 6,326,580 B1 | * | 12/2001 | Hiiro ..................... 219/110 |

FOREIGN PATENT DOCUMENTS

| | | | |
|---|---|---|---|
| DE | 197 31 885 | | 1/1999 |
| JP | 55-62683 | | 5/1980 |
| JP | 55-62684 | | 5/1980 |
| JP | 64-53783 | * | 3/1989 |
| JP | 5-38583 | | 2/1993 |
| JP | 6-36851 | | 2/1994 |
| JP | 10-134925 | * | 5/1998 |
| JP | 10-134925 A | * | 5/1998 |
| JP | 2001-275224 | | 10/2001 |
| JP | 2002-063980 | | 2/2002 |

OTHER PUBLICATIONS

Nakamura et al, Modern Welding Technology, p. 50, published 1980, (no translation).

* cited by examiner

*Primary Examiner*—Kevin P. Kerns
(74) *Attorney, Agent, or Firm*—Harness, Dickey & Pierce, PLC

(57) ABSTRACT

A film-coated wire is wound around a terminal at least one turn and pressed by an upper electrode of a resistance welding machine. A current is passed through the upper electrode when the wire is pressed, and heat is produced. The heat melts a film on the wire. The current is passed between the upper electrode and the lower electrode via the wire and the terminal to connect the wire with the terminal by resistance welding. A contact area between the wire and the terminal is increased by winding the wire around the terminal. Therefore, the wire is less likely to shift its position when a force is applied by the upper electrode. This increases reliability of the connection. Moreover, the terminal is reduced in size because it is not required to be formed in a U-shape.

5 Claims, 2 Drawing Sheets

METHOD FOR CONNECTING FILM-COATED WIRE TO SUBJECT MEMBER

CROSS REFERENCE TO RELATED APPLICATION

This application is based on and incorporates herein by reference Japanese Patent Application No. 2002-141062 filed on May 16, 2002.

FIELD OF THE INVENTION

The present invention relates to a method for connecting a film-coated electric wire to a subject member by resistance welding.

BACKGROUND OF THE INVENTION

A method for connecting a film-coated electric wire to a subject member is disclosed in JP-A-5-38583. A terminal is provided by shaping a conductive plate made of copper or copper alloy into a U-shape. A film-coated electric wire is inserted in a curved portion of the U-shaped conductive member without removing the film. The curved portion is held between upper and lower electrodes. A force is applied and a current is passed between the electrodes. Heat is produced by a resistance between the electrodes and it removes the film on the wire. As a result, a core wire of the wire is exposed. The core wire is connected to the curved portion of the terminal by resistance welding.

Since the terminal is formed into the U-shape in this method, the size of the terminal cannot be reduced in size and weight. To reduce the size of the terminal, another method is disclosed in JP-A-2001-275224. In this method, a terminal is not formed into a U-shape. A film-coated wire is placed on the terminal. The terminal and the wire are held between electrodes. The electrodes produce heat that melts and removes the film on the wire. A current is passed through the core wire and the terminal to connect the core wire and the terminal together by resistance welding. With this method, the terminal and the wire are connected together without shaping the terminal into a U-shape. Therefore, the terminal can be reduced in size.

To heat and apply a force to the film-coated wire via the electrodes, the film-coated wire should be accurately arranged at a predetermined position on the terminal. If not, a contacting area between the electrodes and the wire may vary each time they are brought into contact. As a result, reliability of the connection between the terminal and the wire is reduced.

SUMMARY OF THE INVENTION

The present invention therefore has an objective to provide a method for connecting a film-coated wire to a subject member without increasing a size of the subject member and reducing reliability of the connection between the wire and the subject member. The method includes a winding step, a force applying step, a first current passing step, a film removing step, a second current passing step, and a connecting step.

In the winding step, the film-coated wire is wound around the subject member at least one turn. In the force applying step, a force is applied to the subject member via at least one of first and second electrodes of a resistance welding machine. In the first current passing step, a current is passed between the first and the second electrodes to produce heat. In the film removing step, a film on the film-coated wire is removed by the heat. In the second current passing step, a current is passed between the first and the second electrodes via the film-coated wire and the subject member. In the connecting step, the film-coated wire is connected to the subject member by welding.

With this method, a large contact area is provided between the film-coated wire and the subject member because the film-coated wire is wound around the subject member at least one turn. Therefore, a friction resistance between the film-coated wire and the subject member increases. This reduces a contact area variation that may occur during the application of force via the electrode. As a result, the reliability of the connection between the wire and the subject member is ensured. Furthermore, the subject member can be reduced in size since it is not required to be formed in a U-shape.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
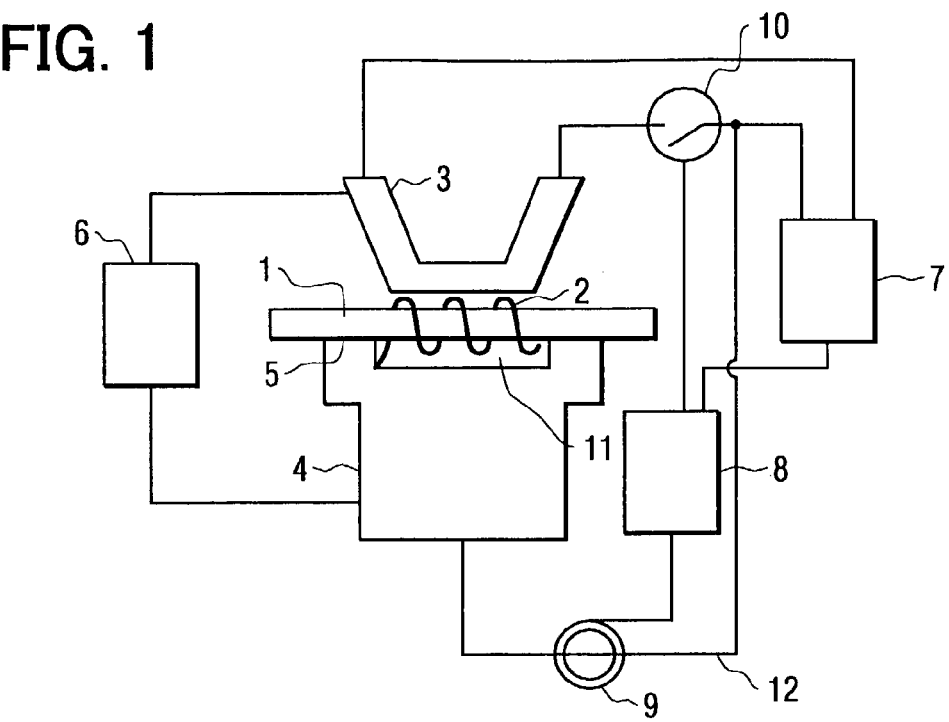
FIG. 1 is a schematic diagram of a resistance welding machine according to the first embodiment of the present invention.

The preferred embodiments of the present invention will be explained with reference to the accompanying drawings. In the drawings, the same numerals are used for the same components and devices.

[First Embodiment]

Referring to FIG. 1, a resistance welding machine includes a terminal 1, a film-coated wire 2, an upper electrode 3, and a lower electrode 4. The film-coated wire 2 is wound around the terminal 1. The upper electrode 3 and the lower electrode 4, both are made of tungsten, face each other on opposed sides of the terminal 1. The lower electrode 4 has contact surfaces 5 on which the terminal 1 is arranged. A force is applied to the upper electrode 3 in the direction toward the terminal 1 so that a pressing surface of the upper electrode 3 is pressed against the film-coated wire 2. The force is generated by a force application device 6 that has an air cylinder.

Wires are routed from a power source 7 to both ends of the upper electrode 3. When a current is passed between the ends of the upper electrode 3, heat is produced. A relay 10 is connected in one of paths between the upper electrode 3 and the power source 7. Power supply to the upper electrode 3 is controlled by the relay 10. The lower electrode 4 has a dent portion 11 between the contact surfaces 5 for housing the film-coated wire 2. Therefore, the film-coated wire 2 is not placed between the terminal 1 and the contact surfaces 5 when they are brought into contact.

The lower electrode 4 is also connected to the power source 7 via connecting wires 12. A current detecting coil 9 is connected in a path between the lower electrode 4 and the power source 7. The current detecting coil 9 is used to detect a current starting to flow through the upper electrode 3 and the lower electrode 4 via the terminal 1 and the film-coated wire 2. This occurs when the film coated around the film-coated wire 2 is removed by the heat produced by the upper electrode 3.

A signal detected by the current detecting coil 9 is inputted to a control device 8. When the control device 8 determines that a current has started to flow through the lower electrode 4 based on the detected signal, it turns off the relay 10 to stop the current flow through the upper electrode 3.

The terminal 1 that is made of electric conductive material, such as copper alloy and copper, has a circular or a square cross section. A diameter of the circular cross section or a crossline of the square cross section is approximately 0.3 mm–5 mm. The film-coated wire 2 is constructed of an electric wire (core wire) and a film made of an insulating material, such as polyimide, polyamide-imide, polyamide-polyester-imide, polyester, polyurethane, enamel, and vinyl. The wire 2 is coated with the film and wound around the terminal 1 at least one turn, preferably multiple turns (two to five turns) before resistance welding. The multiple turns are made in a spiral at intervals so that the removed film does not touch the adjacent wire.

In the film removing step, the upper electrode 3 is pressed against the wire 2 with a force sufficient for the film removal. When the relay 10 is turned on and a current is passed through the upper electrode 3, heat is produced. The heat melts the film on the wire 2. The melted film is removed by the pressing force applied by the upper electrode 3, and the core wire of the wire 2 is exposed.

After the core wire is exposed, the welding step is performed. More specifically, a current starts flowing from the upper electrode 3 to the lower electrode 4 via the core wire and the terminal 1 after the core wire is exposed. The current flowing through the lower electrode 4 is detected by the current detecting coil 9. The control device 8 turns the relay 10 off based on the detected signal. The current only flows between the upper electrode 3 and the lower electrode 4 via the core wire and the terminal 1 after the relay 10 is turned off. Because of this current flow, the core wire is connected to the terminal 1 by the resistance welding.

In the film removing step, the pressing force and the current are adjusted to acquire a connecting strength. The adjustment is made according to the kind of the material used for the film or the thickness of the film. In the welding step, the pressing power and the current are controlled according to the thickness and the kind of the material of the core wire, or the kind of the material of the terminal 1.

In the case that the wire 2 is placed on the terminal 1, the contact area between the wire 2 and the terminal 1 is small. Thus, the wire 2 easily shifts its position when the force is applied. This causes a contact area variation between the upper electrode 3 and the wire 2, which result in an unreliable connection.

In this embodiment, the wire 2 is wound around the terminal 1 multiple turns, which increases the contact area between the wire 2 and the terminal 1. The friction resistance between the wire 2 and the terminal 1 increases and the position shifting of the wire 2 is less likely to happen. Therefore, the wire 2 can be connected to the terminal 1 by resistance welding with the connecting strength.

Furthermore, the dent portion 11 is provided in this embodiment to house the part of the wire 2 adjacent to the lower electrode 4. If the terminal 1 and the wire 2 are pressed by the upper electrode 3, the current cannot flow between the upper electrode 3 and the lower electrode 4 due to the film. By housing the wire 2 in the dent portion 11, a current path between the upper electrode 3 and the lower electrode 4 is provided. The contact surfaces 5 directly contact with the terminal 1. Therefore, the current can flow between the upper electrode 3 and the lower electrode 4 when the film is removed by the upper electrode 3.

[Second Embodiment]

Figure 2:
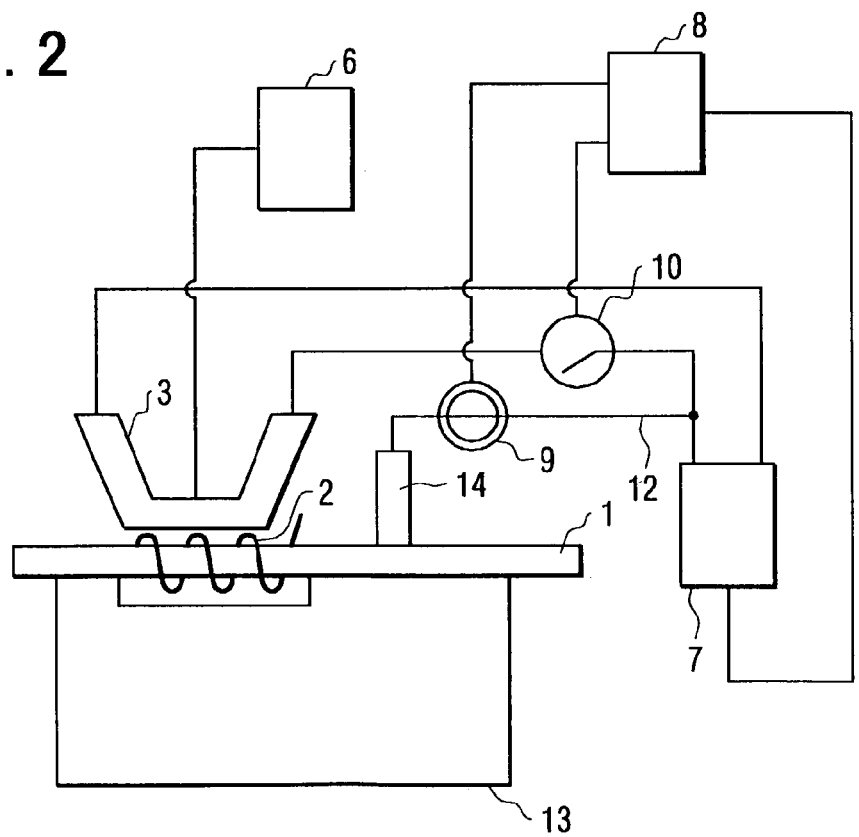
FIG. 2 is a schematic diagram of a resistance welding machine according to the second embodiment of the present invention.

Referring to FIG. 2, a resistance welding machine has a pressure bearing jig 13 and an electrode 14. The jig 13 is provided to stably support a terminal 1 around which a film-coated wire 2 is wound. The jig 13 has a dent portion for housing the film-coated wire 2 and supports the terminal 1 on contact surfaces.

The electrode 14 is arranged on the terminal 1 in a portion that the film-coated wire 2 is not wound around and horizontally in line with an upper electrode 3. With this configuration, the pressing force is not applied to the electrode 14 when the upper electrode 3 is pressed against the terminal 1. The electrode 14 is used in pair with the upper electrode 3. Furthermore, the electrode 14 can be arranged any positions as long as it has contact with the terminal 1. Therefore, the flexibility of the arrangement of the electrode 14 increases.

[Third Embodiment]

Figure 3:
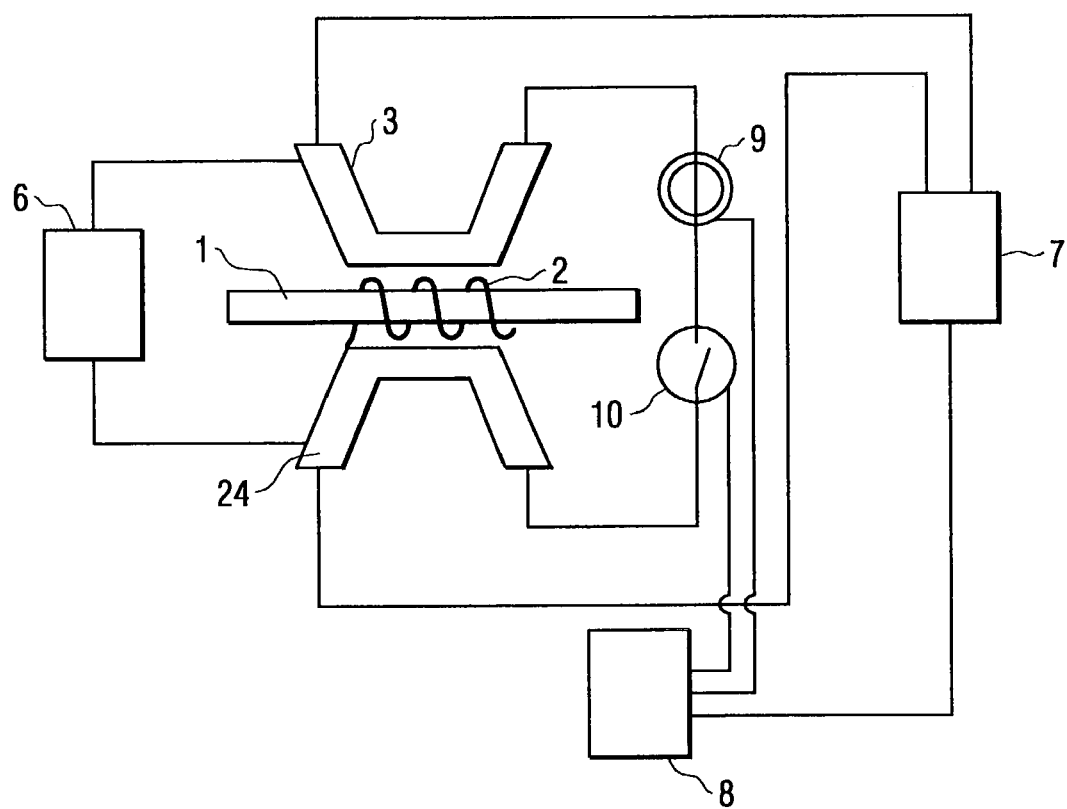
FIG. 3 is a schematic diagram of a resistance welding machine according to the third embodiment of the present invention.

Referring to FIG. 3, a resistance welding machine has a lower electrode 24 and a film melting function. The upper electrode 3 and the lower electrode 24 are connected in series with the power source 7 when the relay 10 is turned on. When the upper electrode 3 and the lower electrode 24 are electrically connected in series, they produce heat and the heat melts the film on the film-coated wire 2. The relay 10 is connected in a path between the upper electrode 3 and the lower electrode 24.

When the film on the wire 2 is removed, a current flows between the electrodes 3 and 24 via the core wire of the wire 2 and the terminal 1. Therefore, an amount of the current flowing through the wire that connects the upper electrode 3 with the lower electrode 24 decreases.

The current detecting coil 9 is connected in a path between the upper electrode 3 and the lower electrode 24 to detect a decrease in current due to the film removal. When the decrease is detected, the control device 8 turns off the relay 10. As a result, the current path between the upper electrode 3 and the lower electrode 24 is formed having only the terminal 1 and the film-coated wire 2 in between. With this configuration, the core wire of the film-coated wire 2 is connected to the terminal 1 by resistance welding.

The present invention should not be limited to the embodiment previously discussed and shown in the figures, but may be implemented in various ways without departing from the spirit of the invention.

What is claimed is:

1. A method for connecting a film-coated wire to a subject member, the film-coated wire including a core wire and a film-coated on the core wire, the method comprising:
   winding the film-coated wire around the subject member at least one turn;
   applying a force directly to the film-coated wire and to the subject member with one of first and second electrodes of a resistance welding machine;
   passing a first current through the one of the first and the second electrodes to produce heat;
   removing the film on the core wire using the heat;

welding the core wire to the subject member by passing a second current between the first and the second electrodes via the core wire and the subject member;
wherein
the force is applied to the subject member via the first electrode;
the second electrode has a dent portion for housing a part of the film-coated wire so that the film-coated wire is not pressed between the second electrode and the subject member;
the second electrode has a contact surface that contacts the subject member; and
the step of applying a force directly to the film-coated wire and to the subject member includes engaging the film-coated wire with only the one of said first and second electrodes.

2. The method according to claim 1, wherein the subject member is formed in a rod shape.

3. The method according to claim 1, further comprising:
determining if a third current flows through the other of the first and second electrodes after passing the first current through the one of the first and second electrodes; and
stopping the first current when it is determined that the third current is flowing.

4. The method according to claim 3, wherein the step of stopping the first current includes turning a relay off.

5. The method according to claim 3, wherein the step of stopping the first current includes opening a circuit within which the first current flows.

* * * * *